United States Patent
Sato et al.

(10) Patent No.: US 6,839,329 B1
(45) Date of Patent: Jan. 4, 2005

(54) CELL FLOW SYNCHRONIZATION ESTABLISHING SYSTEM OF WIRELESS ATM ACCESS SYSTEM

(75) Inventors: Hiroyuki Sato, Tokyo (JP); Yasukazu Murata, Tokyo (JP); Syuji Sakata, Tokyo (JP); Satoru Yamano, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/411,949

(22) Filed: Oct. 4, 1999

(30) Foreign Application Priority Data

Oct. 5, 1998 (JP) ............................................. 10/282592

(51) Int. Cl.[7] .............................. H04B 7/00; H04J 3/06
(52) U.S. Cl. ..................................... 370/310.1; 370/350
(58) Field of Search ................................ 370/395, 310.1, 370/329, 331, 349, 395.1, 350, 338, 341

(56) References Cited

U.S. PATENT DOCUMENTS 5,708,659 A  1/1998 Rostoker et al.
5,802,131 A * 9/1998 Morzano ................... 377/26
6,108,546 A * 8/2000 Kusaki et al. ............. 455/436
6,385,171 B1 * 5/2002 Takase et al. .............. 370/235

FOREIGN PATENT DOCUMENTS

WO    WO 97/31499    8/1997
WO    WO 98/18286    4/1998

* cited by examiner

Primary Examiner—Chau Nguyen
Assistant Examiner—Soon-Dong Hyun
(74) Attorney, Agent, or Firm—Sughrue Mion, PLLC

(57) ABSTRACT

A cell flow synchronization establishing system of an ATM access system, capable of establishing synchronization of cell flow between a mobile station and base stations at the time of hand-off process, is provided. First buffer control unit is provided in the ATM switching station, and second buffer control unit is provided in the mobile station. The first buffer control unit reproduces cell stream to be transmitted by guaranteeing orderness of ATM cell between the first buffer control unit and the second buffer control unit and buffer clear processing is carried out based on predetermined synchronization establishment processing sequence before and after occurrence of handoff.

6 Claims, 7 Drawing Sheets

CELL FLOW SYNCHRONIZATION ESTABLISHING SYSTEM OF WIRELESS ATM ACCESS SYSTEM

BACKGROUND OF THE INVENTION

1. Field of the Invention

The present invention relates to a wireless ATM access system, particularly to a cell flow synchronization establishing system between BS and MS for resolving state incoincidence caused between MS and BS.

2. Description of the Related Art

Generally, in a wireless ATM access system for carrying out communication between BS (Base Station) and MS (Mobile Station, mobile terminal) by using ATM (Asynchronous Transfer Mode: asynchronous communication system) cell, when abnormality in communication is caused by arbitrary communication connection, in order to resolve incoincidence of a communication state between MS and BS, there is carried out a processing of establishing a transmission and reception order of cell stream, that is, a processing of establishing synchronization of cell flow (initialization).

In a conventional cell flow synchronization establishing system of wireless ATM access system, when communication abnormality is detected in arbitrary communication connection, automatically or in accordance with control terminal operation by a maintenance operator, an instruction for establishing synchronization of cell flow is outputted individually to corresponding BS and MS.

FIG. 5 is an explanatory view showing a conventional wireless ATM access system, FIG. 6 is a sequence diagram showing a conventional procedure of establishing synchronization of cell flow and FIG. 7 is a block diagram showing a cell flow synchronization establishing system.

In FIG. 5, an ATM switching station (hereinafter, referred to as MSC, Mobile Switching Center) 1 contains communication connections from a fixed ATM network via NNI (Network Node Interface), contains communication connections with BS 2A and BS 2B via UNI (User Node Interface) and mutually switches and connects the respective communication connections based on control a switch control unit (SW-CNT).

Further, BS 2A or 2B contains MS3 via a wireless I/F (interface).

There are installed cell store buffers 20B and 40B for temporarily storing cell transmitted and received via the wireless section and buffer units 20 and 40 for carrying out communication control in the wireless section by controlling the cell store buffers 20B and 40B at BS 2A, BS 2B and the wireless I/F side of MS3.

As shown by FIG. 7, constitutions of the buffer units 20 and 40 are substantially the same as each other.

A sequence number control buffer 23 is a buffer for controlling a sequence number for guaranteeing reproduction of cell stream, that is, orderness of stream of normal reception cell and reception cell retransmitted by ARQ (Automatic Repeat Request).

A CDV (Cell Delay Variation) control buffer 22 is a buffer for controlling timing for executing reproduction of cell stream by ARQ.

A cell transmission and reception pointer control buffer 24 is a buffer for controlling a pointer value of cell transmitted and received by the cell store buffer 20B.

Further, a high layer interface unit 21 initializes the sequence number control buffer 23, the CDV control buffer 22 and the cell transmission and reception pointer control buffer 24 by setting I/O register in accordance with an instruction of establishing synchronization from a high layer 5.

As shown by FIG. 6, when synchronization establishment instructions 300 and 301 are outputted from the high layer 5 to the buffer units 20 of BS 2A and BS 2B, after making ON flags indicating that the synchronization establishment is being processed (steps 321, 341), corresponding I/O registers are set by which the sequence number control buffer 23, the CDV control buffer 22 and the cell transmission and reception pointer control buffer 24 are initialized (steps 322, 342).

At this occasion, pointer values held by the respective control buffers are initialized to zero and in accordance with completion of initialization (steps 323, 343) the flags of the high layer interface units 21 are set to OFF.

After outputting the synchronization establishment instructions 300 and 301, the high layer 5 successively checks flags of the respective buffer units 20 and 40 at steps of buffer state monitoring 302, 303.

Further, the synchronization establishment instructions 300 and 301 are repeatedly outputted until flag OFF is confirmed, completion of synchronization establishment is confirmed in accordance with flag OFF, communication control states coincide with each other between BS 2A and MS3 and it is determined that the transmission and reception order of cell stream (cell flow), that is, synchronization of cell flow is established.

However, according to such a conventional cell flow synchronization establishing system, no consideration is given to handoff in accordance with movement of MS to outside of a service area and there poses a problem in which when handoff is caused and a processing of switching communication connection is carried out in the midst of clearing a sequence number of a cell in which synchronization of cell flow is being processed and a buffer of BS controlling transmission and reception pointer, a processing of clearing a buffer of old BS before switching the communication connection is interrupted.

Normally, a control pointer of the transmission and reception cell buffer is controlled by the sequence number of a cell and reading and writing of the transmission and reception cell buffer is carried out in reference to the control pointer of the transmission and reception cell buffer.

Accordingly, the processing of clearing the control pointer of the transmission and reception cell buffer (clearing pointer value to "0") signifies clearing of the transmission and reception cell buffer, that is, abandoning a cell stored in the transmission and reception cell buffer.

Therefore, when handoff is caused, communication connection in respect of BS executing the buffer clearing processing is cut with the handoff as a boundary, monitoring from the high layer cannot be carried out and the buffer clearing processing of old BS before switching the communication connection is interrupted in the midway of processing.

Further, depending on timing of occurrence of handoff, the buffer clear processing is instructed from the high layer to new BS after switching the communication connection after occurrence of the handoff to thereby cause to start an incomplete buffer clear processing.

That is, with the handoff as a boundary, the buffer clear processing is carried out in respect of old BS before switching the communication connection and in respect of new BS after switching the communication connection.

Thereby, as a result, not only cell loss is caused but also cell stream cannot be guaranteed on the side of a reception station (indicating MS in the case of a descending circuit, BS in the case of an ascending circuit).

SUMMARY OF THE INVENTION

The present invention resolves such a problem and it is an object thereof to provide a cell flow synchronization establishing system of a wireless ATM access system capable of establishing synchronization of a cell flow between MS and new and old BS and old BS before and after switching communication connection or MSC when handoff is caused.

In order to achieve the object, according to an aspect of the present invention, there is provided a cell flow synchronization establishing system of a wireless ATM access system wherein a side of an ATM network of an ATM switching station comprises a first cell store buffer for temporarily storing and transmitting an ATM cell transmitted and received between the ATM network and the ATM switching station and a first buffer control unit for reproducing a cell stream of respective communication connection and establishing synchronization of a cell flow by controlling the first cell store buffer and wherein a side of a wireless section of a mobile terminal comprises a second cell store buffer for temporarily storing and transmitting the ATM cell transmitted and received between base stations and the mobile terminal station and a second buffer control unit for reproducing the cell stream of the respective communication connection and establishing synchronization of the cell flow by controlling the first cell store buffer.

Further, the first buffer control unit transmits a first synchronization establishment request to the second buffer control unit in accordance with a cell flow synchronization establishment instruction from a high layer in respect of a predetermined communication connection connecting the ATM switching station and the mobile terminal, closes the cell stream of the mobile terminal, starts storing a reception cell to the first cell store buffer, executes a buffer clear processing of various buffers used in reproducing the cell stream of the corresponding communication connection in accordance with a first synchronization establishment instruction from the second buffer control unit and transmits a second synchronization establishment request in respect of a new one of the communication connection after a handoff to the second buffer control unit in accordance with occurrence of the handoff of the mobile terminal establishing synchronization of the cell flow to the second buffer control unit.

Further, the first buffer control unit executes the buffer clear processing of the various buffers used in reproducing the cell stream of the new communication connection after the handoff in accordance with a second synchronization establishment instruction from the second buffer control unit, transmits a synchronization establishment completion notification to the second buffer control unit in accordance with completion of the buffer clear processing, restarts transmitting the cell stored in the first cell store buffer by opening the closed cell stream in accordance with a synchronization establishment completion confirmation notification from the second buffer control unit and transmits a synchronization establishment completion notification to the high layer.

In the meantime, the second buffer control unit transmits the first synchronization establishment instruction to the first buffer control unit in accordance with the first synchronization establishment request from the first buffer control unit, closes the cell stream of the mobile terminal, starts storing the reception cell to the second cell store buffer, executes the buffer clear processing of the various buffers used in reproducing the cell stream of the corresponding communication connection, transmits the second synchronization establishment instruction to the new communication connection after the handoff in accordance with the second synchronization establishment request from the first buffer control unit after the handoff, opens the closed cell stream and restarts transmitting the cell stored in the second cell store buffer in accordance with the synchronization establishment completion notification from the first buffer control unit and transmits the synchronization establishment completion confirmation notification to the first buffer control unit.

DETAILED DESCRIPTION OF THE PREFERRED EMBODIMENTS

Next, an explanation will be given of the present invention in reference to the drawings.

Figure 1:
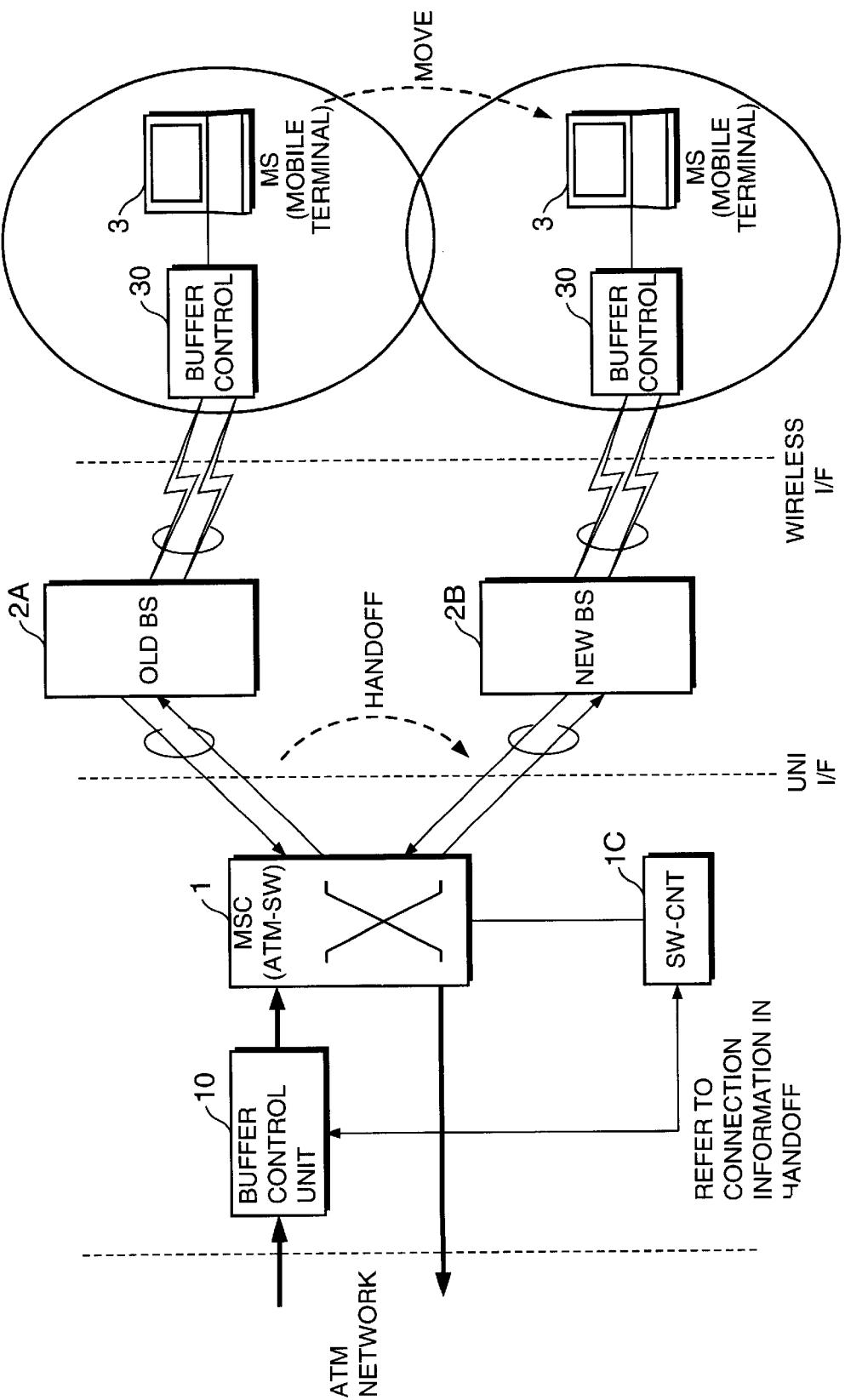
FIG. 1 is a constitution view showing a cell flow synchronization establishing system of a wireless ATM access system according to an embodiment of the present invention.
Figure 2:
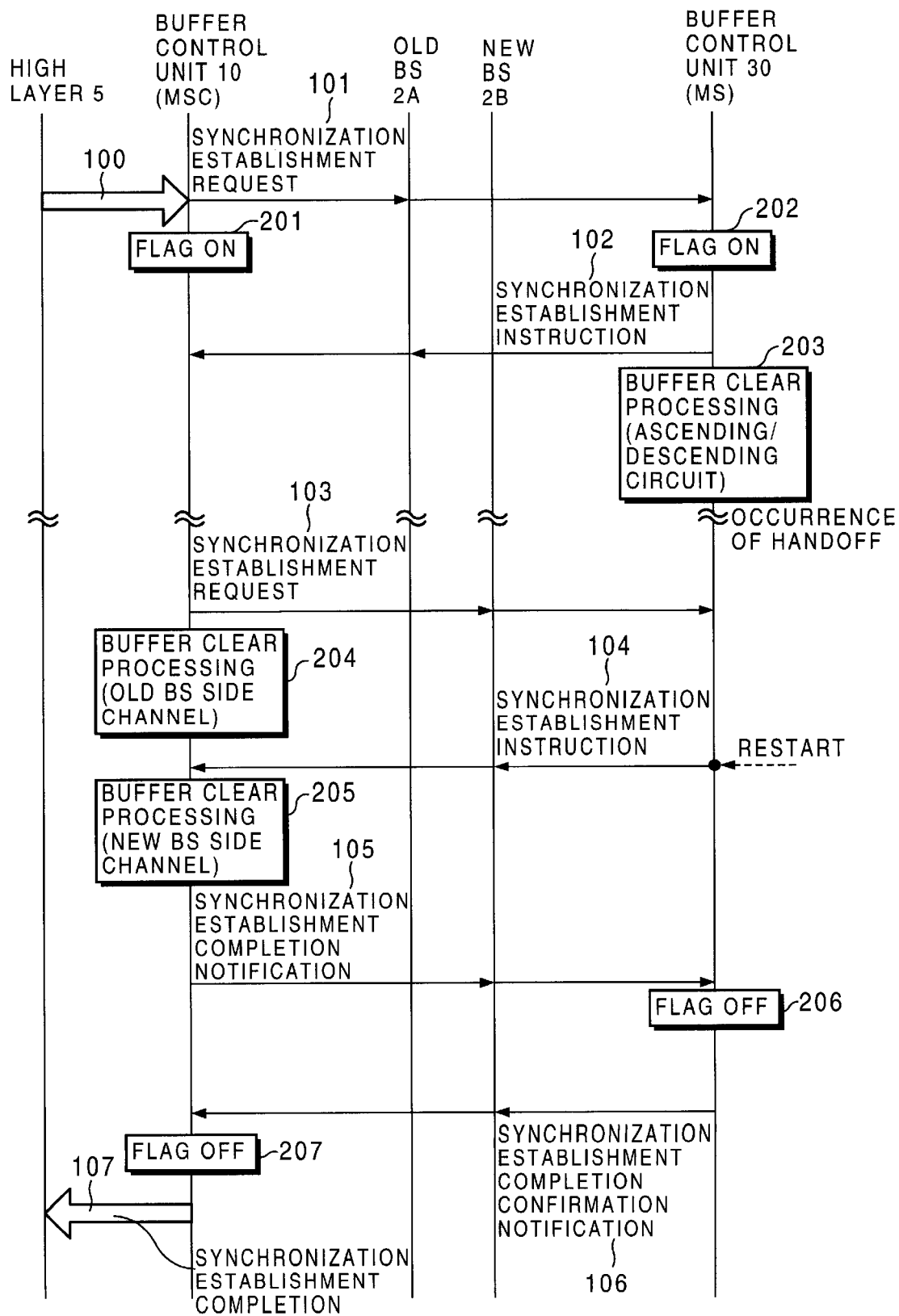
FIG. 2 is a sequence diagram showing a procedure of a processing of establishing synchronization of cell flow.
Figure 3:
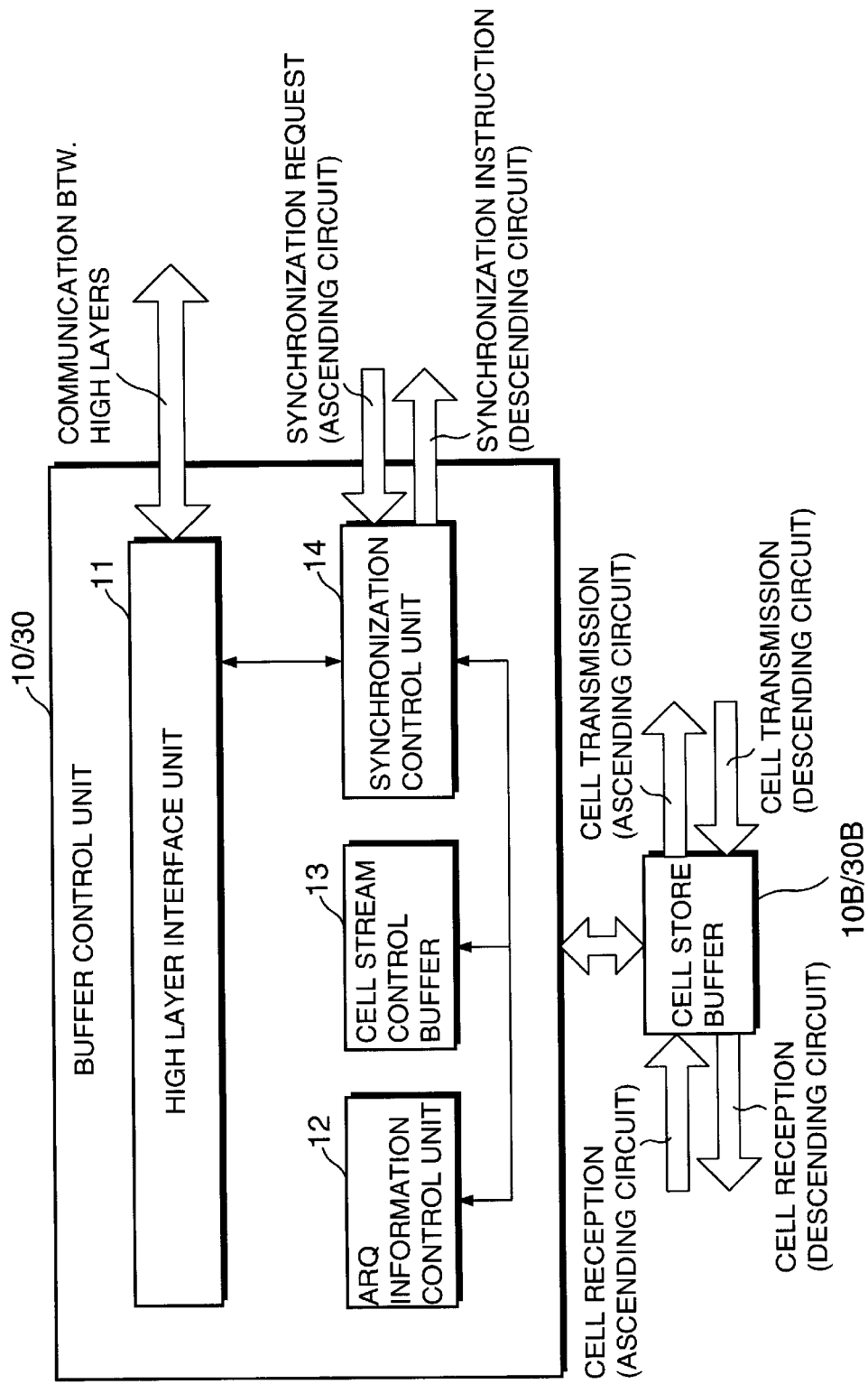
FIG. 3 is a block diagram showing a buffer control unit.
Figure 4:
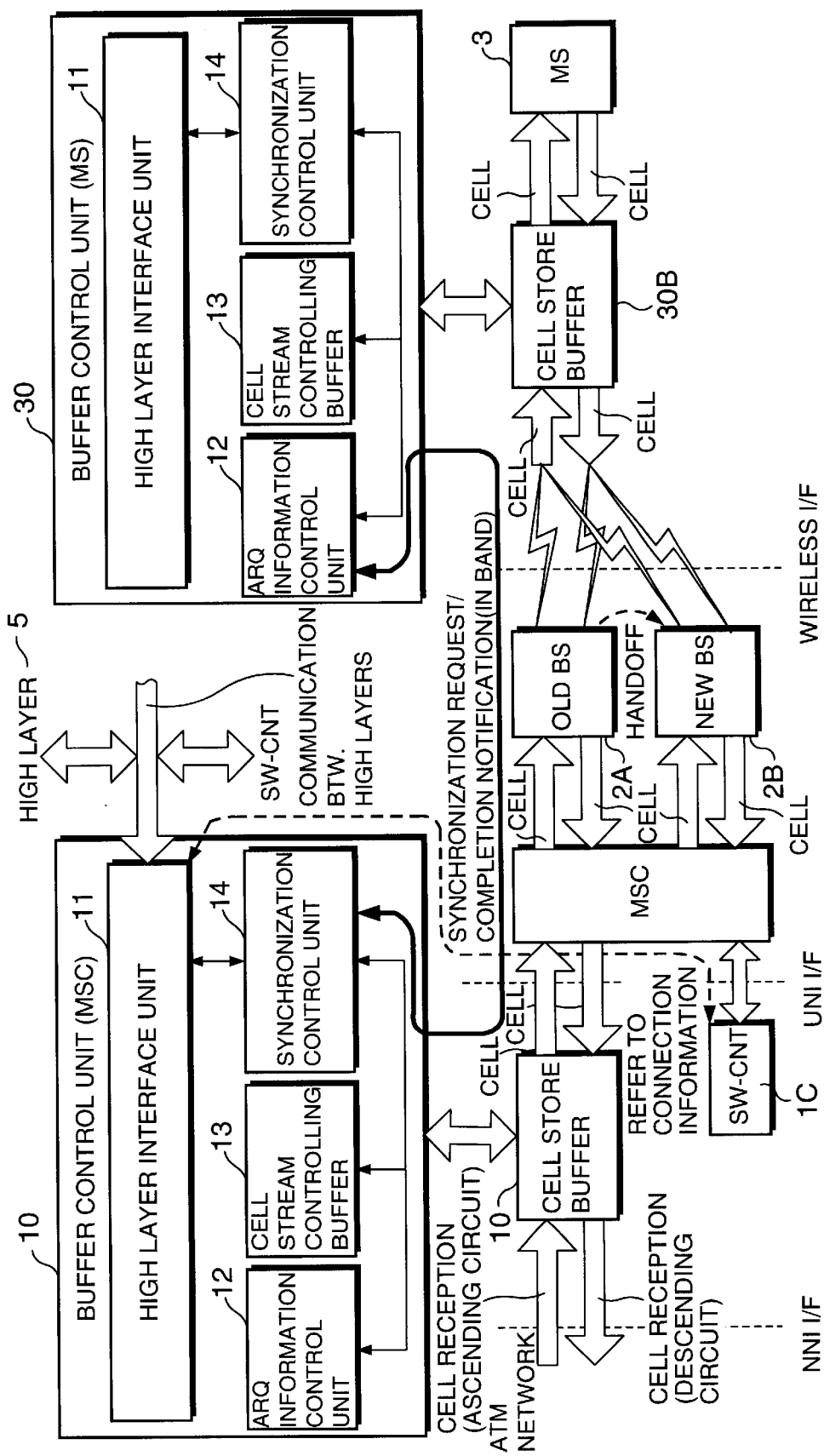
FIG. 4 is an explanatory view showing an example of the processing of establishing synchronization of cell flow.
Figure 5:
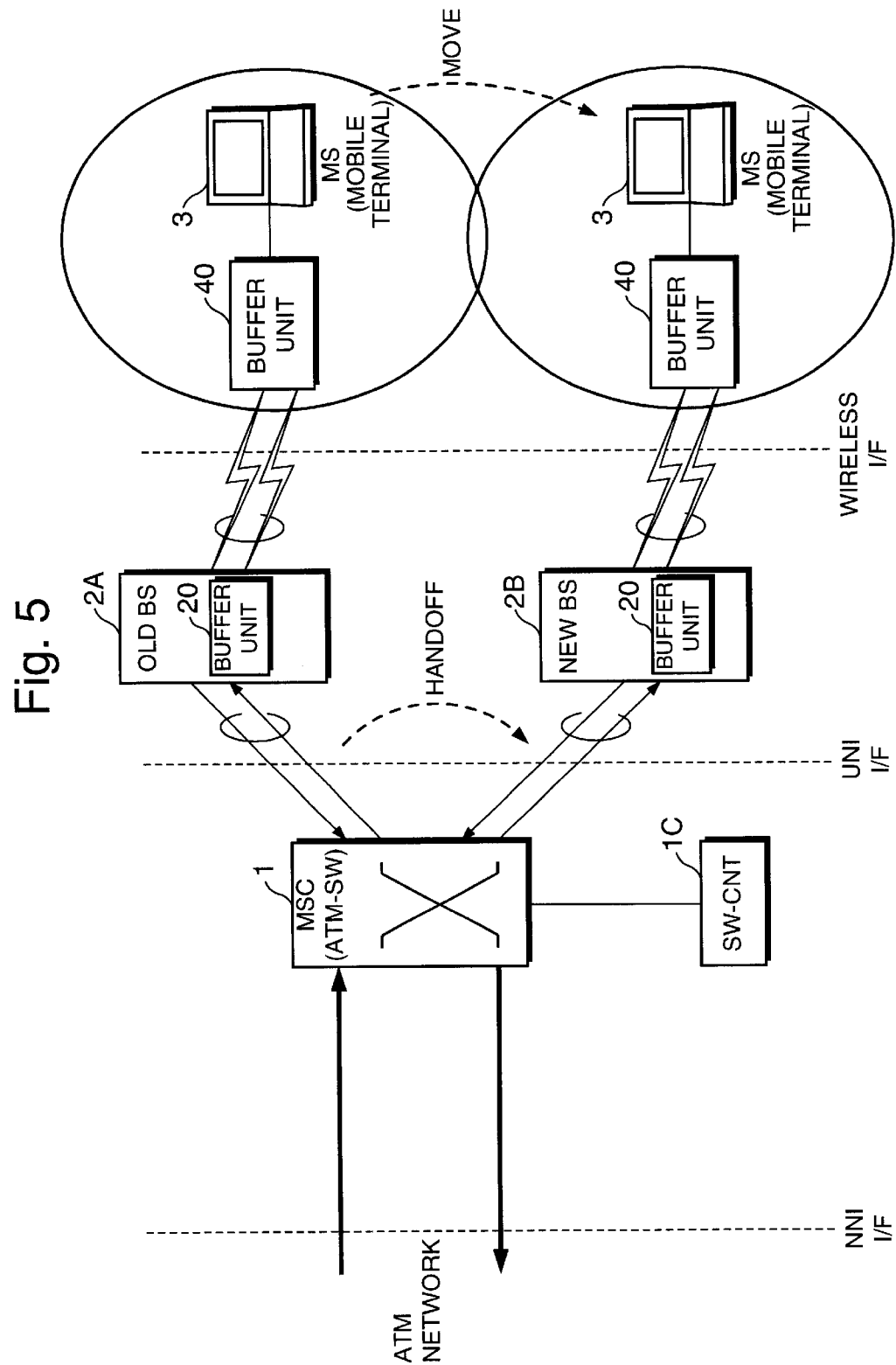
FIG. 5 is constitution view showing a cell flow synchronization establishing system of a wireless ATM access system according to a conventional example.
Figure 6:
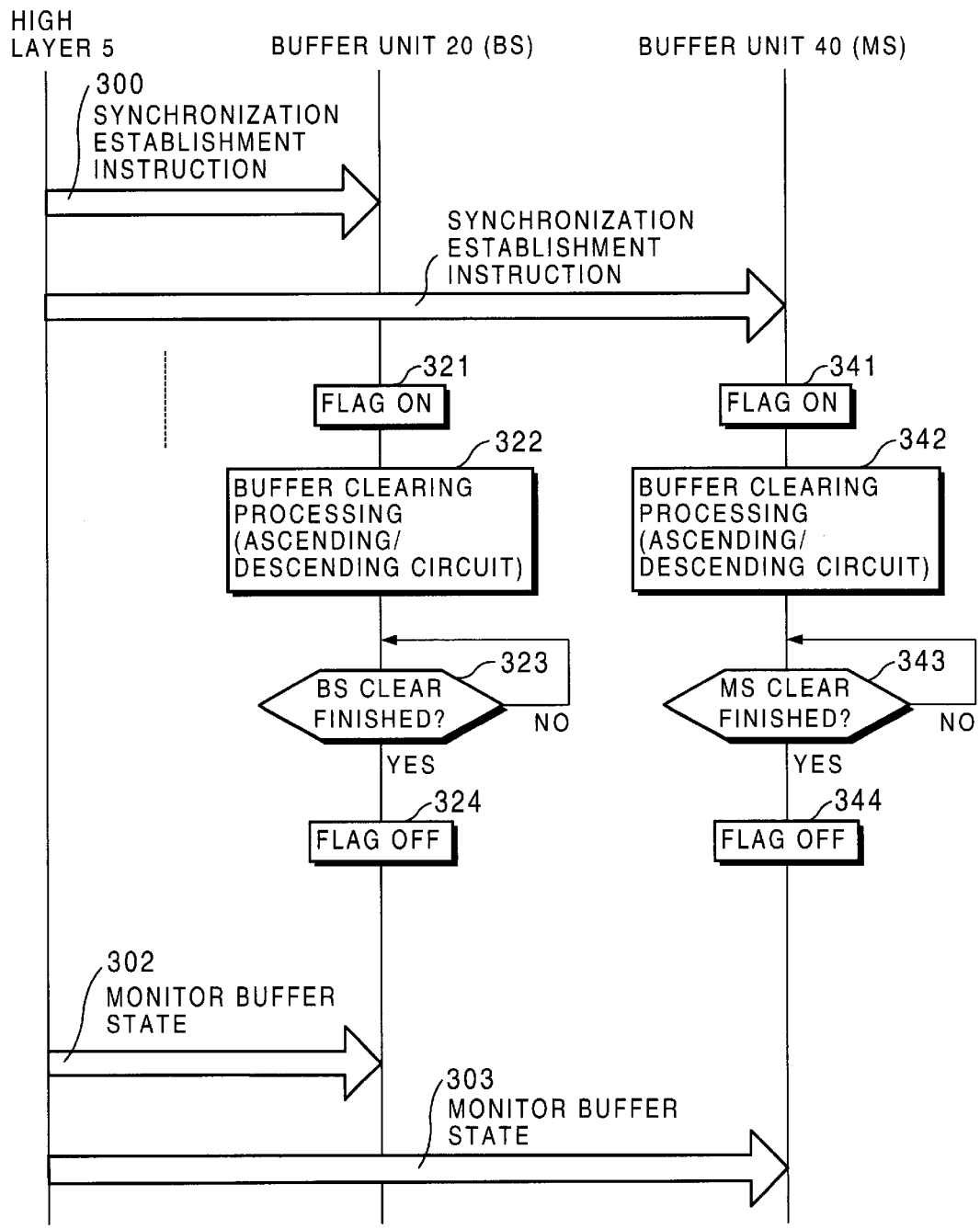
FIG. 6 is a sequence diagram showing a conventional procedure of a processing of establishing synchronization of cell flow.
Figure 7:
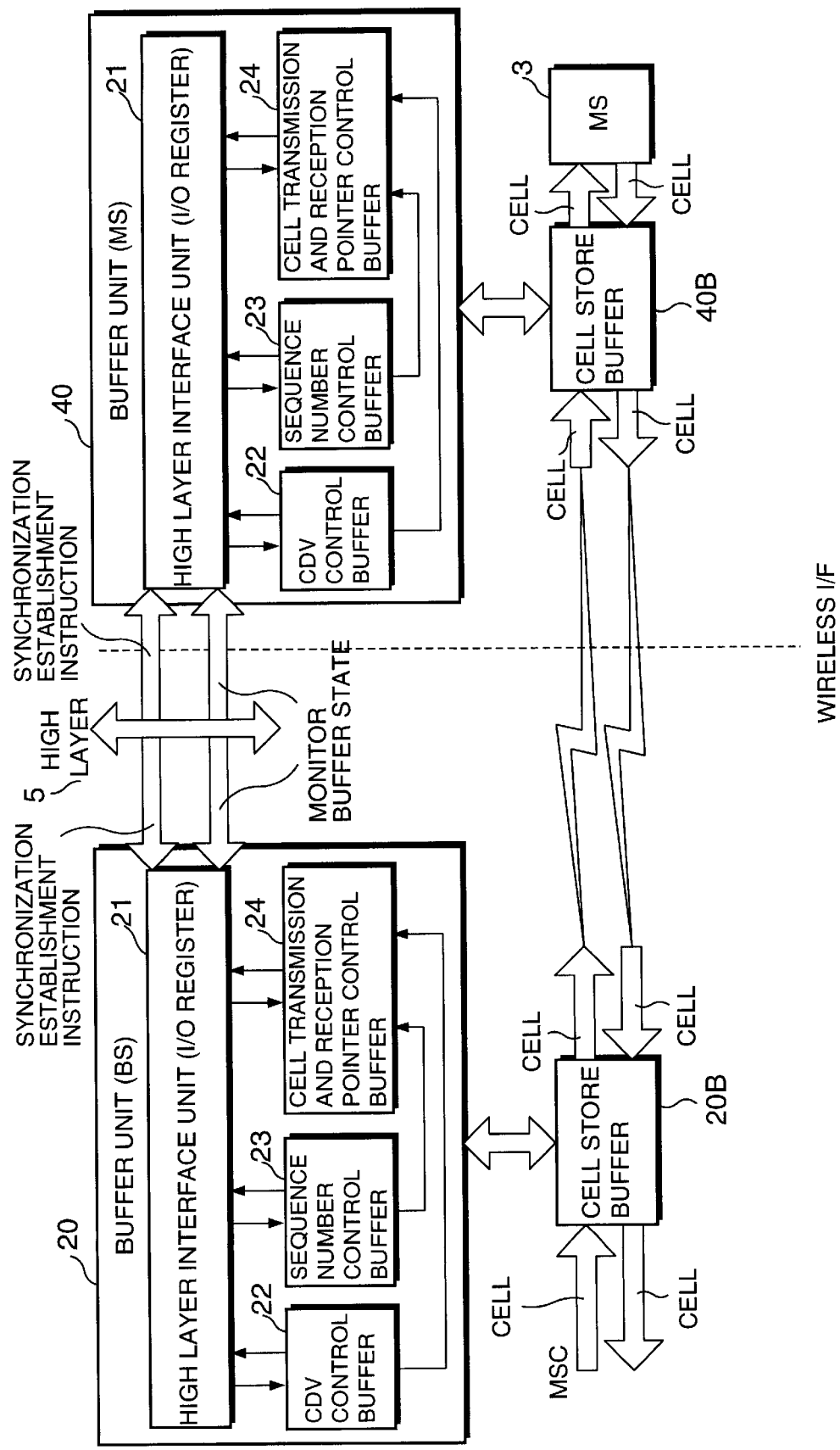
FIG. 7 is an explanatory view showing an example of a processing of establishing synchronization of cell flow.

FIG. 1 is a constitution view showing a cell flow synchronization establishing system of a wireless ATM access system according to an embodiment of the present invention, FIG. 2 is a sequence diagram showing a procedure of a processing of establishing synchronization of cell flow, FIG. 3 is a block diagram showing a buffer control unit and FIG. 4 is an explanatory view showing an example of a processing of establishing synchronization of cell flow.

According to the invention, as shown by FIG. 1, buffer control units 10, 30 (refer to FIG. 3) and cell store buffers 10B and 30B are respectively installed on the ATM network side of an ATM switching station (hereinafter, referred to as MSC, Mobile Switching Center) 1 and the wireless section side of a mobile terminal (hereinafter, referred to as MS: Mobile station) 3 and there is carried out a processing of transferring ATM cell (hereinafter, referred to as cell) by guaranteeing orderness thereof between MSC and BS (Base Station) 2A and BS 2B, that is, reproduction of cell stream (cell flow).

Further, in accordance with cell flow synchronization establishment instruction from a high layer, in respect of new and old communication connections (Virtual Channel) before and after switching corresponding communication connections, based on predetermined synchronization establishing processing sequence (refer to FIG. 2) a buffer clear processing is carried out by which orderness of cell flow, that is, cell stream is synchronized.

In FIG. 1, base stations 2A and 2B contain MS3 via a wireless interface (wireless section) and is connected to MSC1 via UNI interface.

In this case, assume that by handoff in accordance with movement of MS3, communication connection for connecting MSC1 and MS3 is switched from by way of old BS 2A (backward) to by way of new BS 2B (forward).

In FIG. 3, a cell store buffer (first cell store buffer) 10B and a cell store buffer (second cell store buffer) 30B are buffers for temporarily storing reception ATM cell and transmission cell and a writing/reading position thereof is controlled by a transmission and reception pointer of a synchronization control unit 14, mentioned later, and a cell sequence number of an ARQ information control unit 12.

Further, each of the buffer control unit (first buffer control unit) 10 and the buffer control unit (second buffer control unit) 30 is installed with the ARQ information control unit 12, a cell stream controlling buffer 13 and the synchronization control unit 14 other than a high interface unit 11 for carrying out communication with a high layer 5.

The cell stream controlling buffer 13 is installed with a CDV (Cell Delay Variation) control buffer and in order to carry out reproduction of cell stream at a reception station, order of transmission and reception of cell is controlled.

Further, a reception station/transmission station indicates a reception side/a transmission side of two of communicating means connected to both ends of an ascending circuit or a descending circuit of predetermined communication connection.

The ARQ information control unit 12 is installed with a sequence number control buffer at which a cell sequence number for carrying out control of retransmission of cell based on ARQ (Automatic Repeat Request) is controlled.

The synchronization control unit 14 is installed with a transmission and reception pointer control buffer where a writing/reading position of the cell store buffers 10B and 30B is controlled.

Further, in the synchronization control unit 14, there are carried out transmission and reception processings of synchronization establishment request, synchronization establishment instruction, synchronization establishment completion notification and synchronization establishment completion confirmation notification, mentioned later, and insertion and extraction to and from predetermined cell stream for notifying in band signals of notifying these.

Further, there are carried out flag ON/OFF control for closing/opening cell stream and buffer clear processing of various buffers used in reproduction of cell stream and there is carried out setting of a buffer clear value for minimizing cell loss and guaranteeing cell stream in handoff operation.

Further, according to the conventional example, reproduction of cell stream is carried out between each BS and MS, however, according to the invention, reproduction of cell stream is carried out between MSC and MS.

Therefore, at MSC, all of information used in reproduction of cell stream with all of MS connected via respective BS is controlled.

Further, control of the cell sequence number and CDV is carried out by a unit of cell and accordingly, the sequence number control buffer and the CDV control buffer control as pointer values the cell sequence numbers and CDV for respective communication connections by several of cells which can respectively be stored to the cell store buffers 10B and 30B.

In the meantime, the transmission and reception pointer controls each pointer value for each communication connection.

In the high layer interface unit 11, an instruction signal and a completion notification signal in respect of cell flow synchronization establishing processing are transmitted and received to and from a high layer and an existing switch control unit (SW-CNT) 1C for carrying out switching control of MSC1 is referred and connection information in occurrence of handoff is obtained.

An explanation will be given of operation of the present invention in reference to FIG. 2.

In FIG. 2, flag indicates that synchronization establishment is being processed (buffer clear is being processed).

In the case of flag ON, in the buffer control units 10 and 30, user cell stream transmitted and received to and from an ascending/descending circuit is closed and reception cell is stored to a cell store buffer.

According to the present invention, the buffer control unit 10 instructs flag ON to the buffer control unit 30 by notifying synchronization establishment request via a descending circuit. Further, the buffer control unit 30 instructs buffer clear processing to the buffer control unit 10 by notifying synchronization establishment instruction via an ascending circuit.

Further, buffer clear processing in the case of handoff is carried out to buffers of both of new BS and old BS and synchronization states of new BS and old BS are recognized at the synchronization control unit of MS.

The synchronization establishment request is notified in band by using predetermined pulse signals and the request continues transmitting until receiving synchronization establishment instruction in respect of the request.

However, connection is cut after handoff and accordingly, transmission and reception of synchronization establishment request and synchronization establishment instruction in correspondence with communication connection on the side of old BS is not carried out, however, buffer clear processing is autonomously continued.

Further, after finishing the buffer clear processing in correspondence with communication connection on the side of new BS, by synchronization establishment completion notification and synchronization establishment completion confirmation notification, the flags of the buffer control units 30 and 10 are respectively made OFF, the closed cell stream is opened and the stored cell is transmitted.

An explanation will be given of a case in which handoff is caused between BS and BS after buffer clear processing of BS has started in accordance with a procedure in reference to FIGS. 2 and 4 as follows.

Further, until buffer clear processing of MS3 or MSC1 is finished, in order to guarantee the operation, synchronization establishment instruction notified in band is carried out by using predetermined pulse signals.

A side of transmitting the pulse signals continues transmitting the pulse signals periodically until receiving confirmation notification from a reception side.

Further, transmission quality in a wireless section is guaranteed by ARQ, FEC or the like which is a publicly-known technology.

First, in response to synchronization establishment instruction 100 from the high layer 5 received via the high layer interlayer unit 11, the synchronization control unit 14 of the buffer control unit 10 makes ON the flag (201), closes cell stream of a corresponding ascending/descending circuit and stores reception cell to the cell store buffer 10B.

Further, the synchronization control unit 14 transmits synchronization establishment request (first synchronization establishment request) 101 comprising predetermined pulse signals to old BS 2A via a descending circuit through a communication connection separate from that of a main signal system.

The synchronization control unit 14 of the buffer control unit 30 makes ON the flag (202), closes cell stream of an ascending/descending circuit and stores reception cell to the cell store buffer 30B in accordance with synchronization establishment request 101 received via old BS 2A similar to the buffer control unit 10.

Further, synchronization establishment instruction (first synchronization establishment instruction) 102 comprising predetermined pulse signals is transmitted in band via an ascending circuit by using a communication connection separate from that of the main signal system, buffer clear in respect of the buffer control unit 10 is started and buffer clear of its own is also started (203).

According to the buffer clear processing (203), respective pointer values of cell sequence number buffer for ARQ, CDV control buffer for controlling the cell stream reproduction and transmission and reception cell buffer are respectively cleared.

Further, according to the present invention, the pointer values are not cleared to zero in the buffer clear processing but the buffer clear processing is carried out by setting pointer value of cell received at a reception station as new pointer value.

Thereby, connection can be switched while minimizing cell loss in respect of handoff processing caused in processing synchronization establishment.

Further, although pointer value of a reception station may be transmitted and received between transmission and reception stations separately as necessary, pointer value is always transmitted and received between transmission and reception stations by general cell flow control processing for ARQ separate from the cell flow synchronization establishment processing and pointer value of a reception station notified in this way may be used.

In the meantime, also the buffer control unit 10 which receives the synchronization establishment instruction 102 starts buffer clear processing 204 in response to the synchronization establishment request 102 from the buffer control unit 30.

In this case, when handoff from old BS 2A to new BS 2B is caused by movement of MS3, communication connection on the side of old BS 2A is cut.

However, buffer clear processing at the buffer control unit 10 can be executed regardless of cutting the communication connection and accordingly, the buffer clear processing 204 continues thereafter and completion processing is carried out autonomously.

Further, in accordance with occurrence of handoff, in parallel with continuing the buffer clear processing in respect of the old communication connection, based on connection information provided from the switch control unit 1C cell flow synchronization establishment processing is started among MSC1—new BS 2B—MS3 via new communication connection on the side of new BS 2B.

In this case, the synchronization control unit 14 of the buffer control unit 10 transmits in band synchronization establishment request (second synchronization establishment request) 103 comprising predetermined pulse signals via a descending circuit through communication connection separate from that of the main signal system, starts buffer clear in respect of the buffer control unit 30 and starts buffer clear of its own (205).

The synchronization control unit 14 of the buffer control unit 30 transmits in band synchronization establishment instruction (second synchronization establishment instruction) 104 comprising predetermined pulse signals via an ascending circuit through communication connection separate from that of the main signal system in response to the synchronization establishment request 103 received via old BS 2A and starts buffer clear processing of new communication connection in respect of the buffer control unit 10.

Thereby, the synchronization control unit 14 of the buffer control unit 10 starts buffer clear processing of the new communication connection.

Also in the buffer clear processing (205), similar to the above-described, respective pointer values of cell sequence number buffer for ARQ, CDV control buffer controlling reproduction of cell stream and transmission and reception cell buffer are respectively cleared.

Further, according to the present invention, in the buffer clear processing, the pointer values are not cleared to zero but the buffer clear processing is carried out by setting pointer value of cell received at a reception station as new pointer value.

Thereby, connection can be switched while minimizing cell loss in respect of handoff processing caused in the synchronization establishment processing.

After finishing the buffer clear processing (205) in respect of the new communication connection, the synchronization control unit 14 of the buffer control unit 10 notifies synchronization establishment completion 105 to MS3 via a descending circuit.

In response thereto, the synchronization control unit 14 of the buffer control unit 30 makes OFF the flag (206) and returns synchronization establishment completion confirmation notification 106.

Thereby, the synchronization control unit 14 of the buffer control unit 10 confirms reception of the synchronization establishment completion confirmation notification 106, makes OFF the flag (207) and transmits synchronization establishment completion notification 107 to the high layer 5.

Further, in the above-described explanation, actually, synchronization establishment processing by a unit of MS is carried out by grouping VC which is communication connection between MSC1 and MS3.

Thereby, even when handoff is caused at BS (or MSC), MS carries out only buffer clear processing of current communication connection.

Therefore, the buffer clear processing per se is simplified and high speed processing at hardware can be executed.

Further, during a time period in which cell stream is stopped in handoff processing, reception cell is stored at the cell store buffer and accordingly, communication connection can be switched while minimizing cell loss.

Buffers and the like for cell stream control, cell control necessary for ARQ processing and CDV control in handoff can commonly be used and accordingly, mounting operation can be carried out without installing new buffers.

Further, as shown by FIG. 4, information of start/completion or the like of buffer clear processing in respect of new and old communication connections is recognized by the synchronization control unit 12 of MS3.

The high layer interface unit 11 refers communication connection information to the switch control unit 1C of MSC1.

The high layer interface unit 11 is used only at the buffer control unit 10 on the side of MSC1.

Accordingly, the high layer interface unit 11 in the buffer control unit 30 on the side of MS3 is not used.

As has been explained, although according to the conventional system, when handoff is caused in buffer clear operation mainly of BS, BS per se is switched and accordingly, the buffer clear processing may be interrupted, by using function and constitution of the present invention, even when handoff is caused, the buffer clear processing can firmly be executed with no interruption.

Further, in the buffer clear processing, the buffer is not simply cleared to zero but the buffer is set with a pertinent buffer clear value and accordingly, in respect of cell before carrying out reproduction of cell stream which is received on the side of a reception station before the buffer clear processing, cell loss can be prevented, further, even when handoff is not caused, cell loss in buffer clear operation can be minimized and reproduction of cell stream guaranteeing a sequence number of cell can be carried out on the side of the reception station.

While this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is, therefore, contemplated that the appended claims will cover any such modifications or embodiments as fall within the true scope of the invention.

What is claimed is:

1. A cell flow synchronization establishing system of an ATM access system in a wireless ATM access system which includes an ATM switching station for carrying out a switching processing with an ATM network, a plurality of base stations connected to the switching station and a mobile terminal connected to the base stations via a wireless interface for carrying out an ATM communication between the ATM network and the mobile terminal by forming a cell stream of an ATM cell by using a predetermined communication connection between the ATM switching station and the mobile terminal via the base stations, said cell flow synchronization establishing system comprising;

a first cell store buffer provided in the ATM switching station for temporarily storing and transmitting the ATM cell transmitted and received between the ATM network and the ATM switching station; and a first buffer control unit provided in the ATM switching station for reproducing the cell stream of the respective communication connection and establishing synchronization of a cell flow by controlling the first cell store buffer;

a second cell store buffer provided in the mobile terminal for temporarily storing and transmitting the ATM cell transmitted and received between the base stations and the mobile terminal station; and a second buffer control unit provided in the mobile communication connection and establishing synchronization of the cell flow by controlling the first cell store buffer, wherein the first buffer control unit transmits a first synchronization establishment request to the second buffer control unit accordance with a cell flow synchronization establishment instruction from a high layer in respect of the predetermined communication connection connecting the ATM switching station and the mobile terminal, closes the cell stream of the mobile terminal, starts storing a reception cell to the first cell store buffer, executes a buffer clear processing of various buffers used in reproducing the cell stream of the corresponding communication connection in accordance with a first synchronization establishment instruction from the second buffer control unit, transmits a second synchronization establishment request in respect of a new one of the communication connection after a handoff to the second buffer control unit in accordance with occurrence of the handoff of the mobile terminal establishing synchronization of the cell flow to the second buffer control unit, executes the buffer clear processing of the various buffers used in reproducing the cell stream of the new communication connection after the handoff in accordance with a second synchronization establishment instruction from the second buffer control unit, transmits a synchronization establishment completion notification to the second buffer control unit in accordance with completion of the buffer clear processing restarts transmitting the cell stored in the first cell store buffer by opening the closed cell stream in accordance with a synchronization establishment completion confirmation notification from the second buffer control unit and transmits a synchronization establishment completion notification to the high layer.

2. A cell flow synchronization establishing system of an ATM access system in a wireless ATM access system which includes an ATM switching station for carrying out a switching processing with an ATM network, a plurality of base stations connected to the switching station and a mobile terminal connected to the base stations via a wireless interface for carrying out an ATM communication between the ATM network and the mobile terminal by forming a cell stream of an ATM cell by using a predetermined communication connection between the ATM switching station and the mobile terminal via the base stations, said cell flow synchronization establishing system comprising;

a first cell store buffer provided in the ATM switching station for temporarily storing and transmitting the ATM cell transmitted and received between the ATM network and the ATM switching station; and a first buffer control unit provided in the ATM switching station for reproducing the cell stream of the respective communication connection and establishing synchronization of a cell flow by controlling the first cell store buffer;

a second cell store buffer provided in the mobile terminal for temporarily storing and transmitting the ATM cell transmitted and received between the base stations and the mobile terminal station; and a second buffer control unit provided in the mobile communication connection and establishing synchronization of the cell flow by controlling the first cell store buffer, wherein the second buffer control unit transmits a first synchronization establishment instruction to the first buffer control unit in accordance with a first synchronization establishment request from the first buffer control unit, closes a cell stream of the mobile terminal, starts storing a reception cell to the second cell store buffer, executes a buffer clear processing of the various buffers used in reproducing the cell stream of the corresponding communication connection, transmits a second synchronization establishment instruction to a new communication connection after the handoff in accordance with the second synchronization establishment request from the first buffer control unit after a handoff, opens the closed cell stream and restarts transmitting the cell stored in the second cell store buffer in accordance with a synchronization establishment completion notification from the first buffer control unit and transmits a synchronization establishment completion confirmation notification to the first buffer control unit.

3. A cell flow synchronization establishing system of an ATM access system in a wireless ATM access system which includes an ATM switching station for carrying out a switching processing with an ATM network, a plurality of base stations connected to the switching station and a mobile terminal connected to the base stations via a wireless interface for carrying out an ATM communication between the ATM network and the mobile terminal by forming a cell stream of an ATM cell by using a predetermined communication connection between the ATM switching station and the mobile terminal via the base stations, said cell flow synchronization establishing system comprising;

a first cell store buffer provided in the ATM switching station for temporarily storing and transmitting the ATM cell transmitted and received between the ATM network and the ATM switching station; and a first buffer control unit provided in the ATM switching station for reproducing the cell stream of the respective communication connection and establishing synchronization of a cell flow by controlling the first cell store buffer;

a second cell store buffer provided in the mobile terminal for temporarily storing and transmitting the ATM cell transmitted and received between the base stations and the mobile terminal station; and a second buffer control unit provided in the mobile communication connection and establishing synchronization of the cell flow by controlling the first cell store buffer, wherein the first and the second buffer control units each further comprising;

a high interface unit for executing communication with the high layer;

a cell stream control buffer having a CDV control butter for controlling a transmission and reception order of the cell for reproducing the cell stream on a side of a reception station of the respective communication connection;

an ARQ information control unit having a sequence number control buffer for controlling a cell sequence number for controlling to retransmit the cell based on ARQ; and a synchronization control unit having a transmission and reception pointer control buffer for controlling a cell writing/reading position of the corresponding cell store buffer, closing/opening the cell stream in the cell store buffer and clearing the various buffers used in reproducing the cell stream by controlling the cell stream control buffer and the ARQ information control unit when synchronization of the cell flow is established.

4. The cell flow synchronization establishing system of an ATM access system according to claim 3, wherein the synchronization control unit clears the buffers by setting a transmission and reception pointer value on a side of a reception station of the corresponding communication connection to a transmission and reception pointer value on a side of a transmission.

5. The cell flow synchronization establishing system of an ATM access system according to claim 1, wherein the respective buffer control units notify the respective synchronization establishment requests, the respective synchronization establishment instructions, the synchronization establishment completion notification and the synchronization establishment completion confirmation notification by predetermined pulse signals via a communication connection separate from the communication connection constituting an object of the synchronization establishment processing.

6. The cell flow synchronization establishing system of an ATM access system according to claim 2, wherein the respective buffer control units notify the respective synchronization establishment requests, the respective synchronization establishment instructions, the synchronization establishment completion notification and the synchronization establishment completion confirmation notification by predetermined pulse signals via a communication connection separate from the communication connection constituting an object of the synchronization establishment processing.

* * * * *